(12) United States Patent
Klaczynski et al.

(10) Patent No.: US 11,186,050 B2
(45) Date of Patent: Nov. 30, 2021

(54) DESKTOP DEVICE AND A METHOD FOR POSTPROCESSING OF A PLASTIC PRODUCT

(71) Applicant: ZORTRAX S.A., Olsztyn (PL)

(72) Inventors: Robert Klaczynski, Olsztyn (PL); Krzysztof Urban, Rydzyna (PL); Mateusz Piotrzkowski, Gdansk (PL); Rafal Tomasiak, Olsztyn (PL)

(73) Assignee: ZORTRAX S.A., Olsztyn (PL)

( * ) Notice: Subject to any disclaimer, the term of this patent is extended or adjusted under 35 U.S.C. 154(b) by 0 days.

(21) Appl. No.: 16/068,331

(22) PCT Filed: Jul. 3, 2018

(86) PCT No.: PCT/EP2018/067858
§ 371 (c)(1),
(2) Date: Jul. 5, 2018

(87) PCT Pub. No.: WO2020/007442
PCT Pub. Date: Jan. 9, 2020

(65) Prior Publication Data
US 2021/0114320 A1    Apr. 22, 2021

(30) Foreign Application Priority Data
Jul. 2, 2018  (EP) ..................................... 18461570

(51) Int. Cl.
*B33Y 10/00*    (2015.01)
*B33Y 30/00*    (2015.01)
(Continued)

(52) U.S. Cl.
CPC .......... *B29C 71/0009* (2013.01); *B29C 64/30* (2017.08); *B29C 64/35* (2017.08);
(Continued)

(58) Field of Classification Search
CPC ....... B29C 64/30; B29C 64/35; B29C 64/386; B29C 64/393; B29C 71/0009;
(Continued)

(56) References Cited

U.S. PATENT DOCUMENTS 4,455,135 A * 6/1984 Bitterly .................... B01J 3/006
                                                                34/92 X
5,768,799 A * 6/1998 Delaunay ............. B05D 3/0281
                                                                34/443 X
(Continued)

FOREIGN PATENT DOCUMENTS

FR    3056146 A1    3/2018
RU    2625848 C1    7/2017

OTHER PUBLICATIONS

The extended European Search Report dated Jan. 25, 2019, by the European Patent Office in corresponding European Application No. 18461570.6. (7 pages).

*Primary Examiner* — Leo B Tentoni
(74) *Attorney, Agent, or Firm* — Buchanan Ingersoll & Rooney PC

(57) ABSTRACT

The disclosure relates to an advanced desktop-type device that allows automatic post-processing of 3D models made by additive manufacturing process utilizing melted polymer layers to improve the quality of the final product and to improve the process parameters. A method for solvent vapor smoothing of a surface of a plastic product by: placing the plastic product to be smoothed in a closed chamber (110) with an evaporator (111) for solvent located at a bottom of the chamber (110); introducing (504) a solvent to the evaporator (111); circulating (505) solvent vapors inside the chamber (110) in a direction from the bottom to a top of the chamber (110); allowing (506) the solvent vapors to con-
(Continued)

dense on the outer surface of the product; and collecting solvent vapors from the upper portion of the chamber (110).

15 Claims, 8 Drawing Sheets

(51) Int. Cl.
*B29C 71/00* (2006.01)
*B29C 64/35* (2017.01)
*B29C 64/30* (2017.01)
*B33Y 40/20* (2020.01)
*F26B 3/04* (2006.01)
*F26B 9/06* (2006.01)
*F26B 21/02* (2006.01)

(52) U.S. Cl.
CPC ............... *B33Y 40/20* (2020.01); *F26B 3/04* (2013.01); *F26B 9/06* (2013.01); *F26B 21/02* (2013.01)

(58) Field of Classification Search
CPC ......... B33Y 10/00; B33Y 30/00; B33Y 40/20; B33Y 50/00; B33Y 50/02; F26B 3/04; F26B 9/06; F26B 21/02
USPC ....... 264/37.13, 40.1, 40.6, 341; 425/73, 74, 425/135, 136, 151, 445; 34/73, 76, 77, 34/78, 92, 403, 443, 468, 469, 470, 497, 34/549, 559

See application file for complete search history.

(56) References Cited

U.S. PATENT DOCUMENTS

| | | | | |
|---|---|---|---|---|
| 2009/0321972 | A1* | 12/2009 | Zinniel | ............... B29C 71/0009 264/37.13 |
| 2013/0205614 | A1* | 8/2013 | Konkle | .................... F26B 5/04 34/92 |
| 2014/0370139 | A1* | 12/2014 | Horiuchi | ................. B29C 45/84 425/136 |
| 2019/0375158 | A1* | 12/2019 | Crabtree | ............ B29C 71/0009 |

* cited by examiner

DESKTOP DEVICE AND A METHOD FOR POSTPROCESSING OF A PLASTIC PRODUCT

TECHNICAL FIELD

The present disclosure relates to a desktop device and a method for post-processing of a plastic product. In particular, the present disclosure relates to an advanced desktop-type device that allows automatic post-processing of 3D models made by additive manufacturing process utilizing melted polymer layers to improve the quality of the final product and to improve the process parameters.

BACKGROUND

Products made by increasingly popular 3D printing technologies usually have a layered structure, which is visible by a naked eye. This relates in particular to Layer Plastic Deposition (LPD) technology, wherein a thermoplastic material (filament) is melted in an extruder and layered on a working platform, thereby creating a three-dimensional product.

In order to enhance visual aspects of such products, their surface may be smoothed by means of a process known as solvent vapor smoothing, in which the product is treated with a solvent vapor which condenses on a surface of the product, thereby making it smoother.

There are known various devices for performing the solvent vapor smoothing process, typically comprising a chamber in which a treated object is placed to be in contact with solvent vapors.

The process of solvent vapor smoothing of plastic products performed by the known devices and methods is typically a long lasting process in which highly concentrated solvents are used. This causes several problems. For example, it is difficult to avoid emission of harmful solvent vapors from the working chamber of the device to the ambient environment. Moreover, the smoothing process is not uniform and in some regions the product subject to the smoothing process tends to deform, while in other regions the surface is not smoothed to a satisfactory degree.

Therefore, there is a need to provide an improved device and a method for solvent vapor smoothing of a surface of a plastic product.

SUMMARY

There is disclosed a method for solvent vapor smoothing of a surface of a plastic product, the method comprising the steps of: placing the plastic product to be smoothed in a closed chamber comprising an evaporator for solvent located at a bottom of the chamber; introducing a solvent to the evaporator; circulating solvent vapors inside the chamber in a direction from the bottom to a top of the chamber; allowing the solvent vapors to condense on the outer surface of the product; collecting solvent vapors from the upper portion of the chamber.

The chamber may have heated walls and the method further comprises, prior to introducing a solvent to the evaporator, heating at least one wall of the chamber to a first temperature and heating the evaporator to a second temperature, wherein the first temperature is higher than the expected dew point temperature of the solvent and wherein the second temperature is higher than the expected boiling temperature of the solvent for a current pressure within the chamber.

The chamber may have heated walls and the method further comprises, after allowing the solvent vapors to condense on the outer surface of the product, heating at least one wall of the chamber, collecting solvent vapors from the chamber and condensing the collected solvent vapors outside the chamber.

The method may further comprise, before introducing the solvent to the evaporator, generating within the chamber a negative pressure with respect to an ambient pressure.

The negative pressure may equal 300 to 800 mbar.

There is also disclosed a device for solvent vapor smoothing of a surface of a plastic product, the device comprising: a closed chamber comprising an evaporator for solvent located at a bottom of the chamber; and a circulation system for circulating solvent vapors inside the chamber in a direction from the bottom to a top of the chamber and outside the chamber in a direction from the top to the bottom of the chamber in a closed loop system.

The chamber may comprise heated walls and a heated evaporator for solvent; and the device may further comprise a controller that is further configured to, before introducing the solvent to the evaporator: determine process parameters, comprising an expected dew point of the solvent and an expected boiling temperature of the solvent; and activate heating elements to heat at least one wall of the chamber to a first temperature and heat the evaporator to a second temperature, wherein the first temperature is higher than the expected dew point temperature of the solvent and wherein the second temperature is higher than the expected boiling temperature of the solvent for a current pressure within the chamber.

The chamber may further comprise a refrigerating module for collecting solvent vapors from the chamber; and the controller may be further configured to, after allowing the solvent vapors to be condensed on the outer surface of the product: activate the heating elements to heat at least one wall of the chamber; and activate the refrigerating module to condense the collected solvent vapors outside the chamber.

The device may further comprise a pressure module with a vacuum pump for producing a negative pressure within the chamber.

The refrigerating module may comprise air ducts for guiding the collected solvent vapors, wherein the air ducts are thermally coupled with Peltier modules.

The warm side of the Peltier modules may be coupled with a heat sink cooled by a cooling fan.

The device may further comprise a strain gauge mounted on an outer surface of a side wall of the chamber.

The device may further comprise an electromagnetic lock for securing the door of the chamber during the smoothing process.

The device may further comprise a transfer tube for guiding solvent vapors from an inlet at the upper portion of the chamber to a main solvent tank under the force of gravity.

The solvent may be transferrable from the main solvent tank to the evaporator under the force of gravity via a solvent dosing valve.

The method and device as defined above are particularly useful for improving the solvent vapor smoothing process with respect to the problem of the tendency of the small elements (details) of the product to bend downwards under gravity due to the melting action of the solvent and the high temperature, by circulating solvent vapors inside the chamber in a direction from the bottom to a top of the chamber.

The other, optional features of the method and device are useful for improving the solvent vapor smoothing process with respect to various other problems, such as, but not limited to:
- preventing condensation of solvent on walls to improve the solvent concentration within the chamber and/or to avoid solvent dropping from the top wall towards the heated object, by generating a high temperature gradient between the product and solvent vapors before starting the vaporization;
- efficiently removing the solvent vapors from the chamber and the product by cooling and condensing the solvent vapors at the end of the process;
- preventing the chamber from depressurization (leaking) due to subsequent increase of pressure during solvent vaporization, by generating a negative pressure within the chamber.

BRIEF DESCRIPTION OF DRAWINGS

The device and the method presented herein are presented by means of example embodiments on a drawing, wherein.

DETAILED DESCRIPTION

Figure 1A:
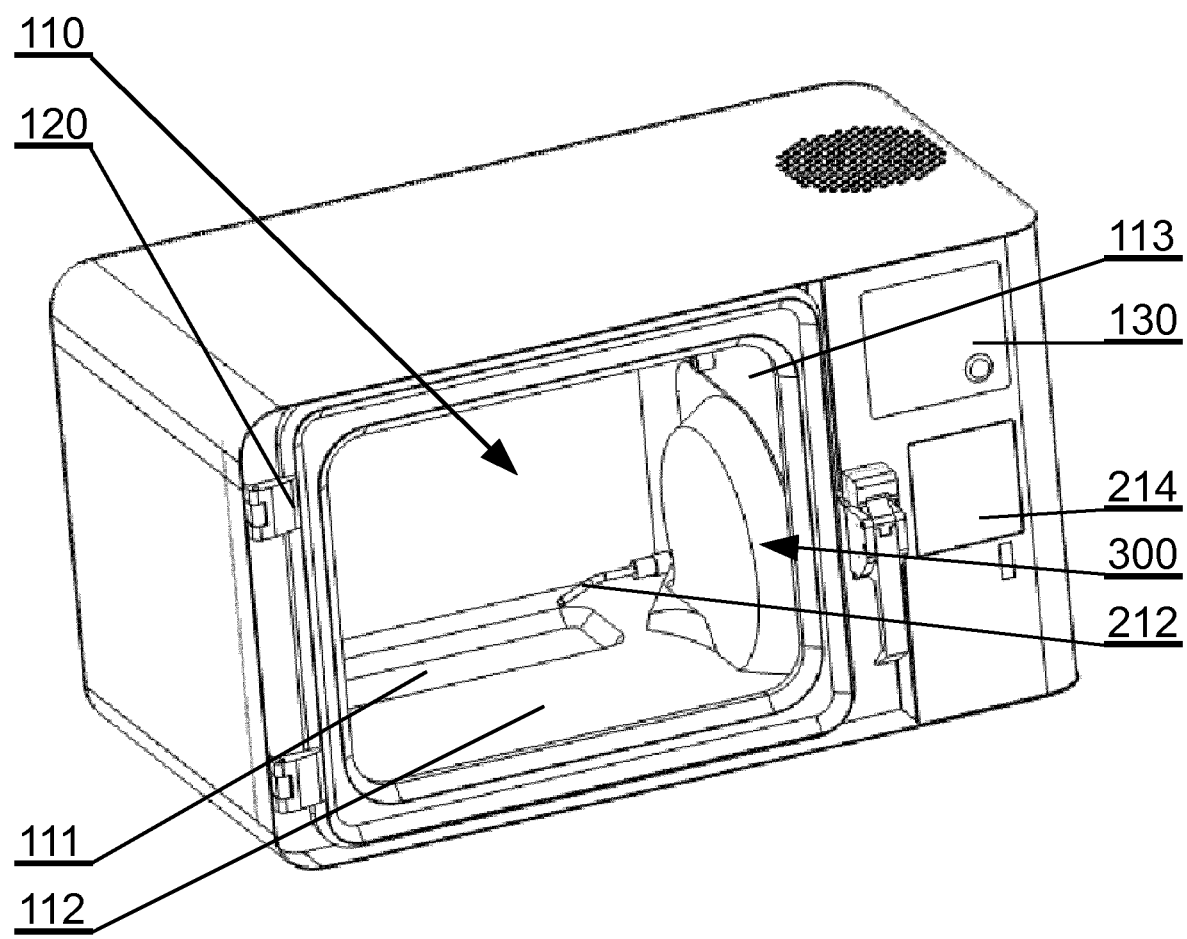
FIG. 1a presents a device for solvent vapor smoothing in an isometric view.

FIG. 1a presents an example embodiment of a device for solvent vapor smoothing in an isometric view. The device comprises a chamber 110 closed by a sealed door 120. Preferably, the chamber 110 is made of metal. A product to be smoothed is placed inside the chamber.

Preferably, the product is placed on a table 140 (FIG. 4) having the table top located from 1 cm to 5 cm (preferably, 2 cm) above a bottom wall 112 of the chamber. The table 140 is preferably made of glass, but it may be also made of steel, aluminium or other suitable materials.

An evaporator 111 is positioned at the bottom of the chamber, for example placed within the bottom wall 112. The evaporator 111 may have a form of an indentation, to which a portion of the solvent is transferred through a duct 212.

Figure 2:
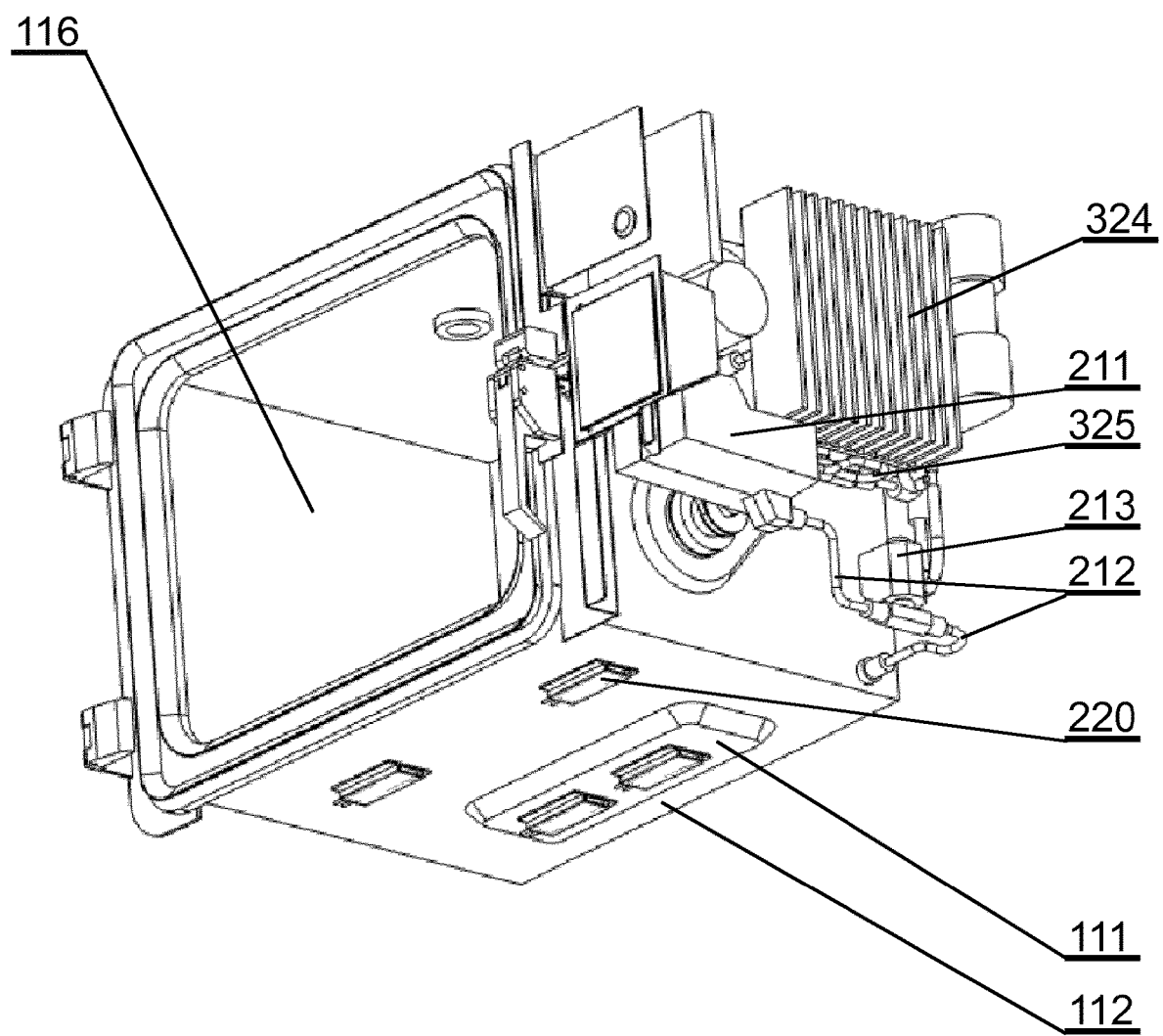
FIG. 2 presents the device without a cover in an isometric view.

The solvent may be transferred to the evaporator 111 under a force of gravity (i.e. without using a pump) from a main solvent tank 211 (FIG. 2). This eliminates the need to use solvent-resistant pumps and requires only a solvent-resistant duct 212 to guide the solvent from the tank 211 to the evaporator 111.

Figure 1B:
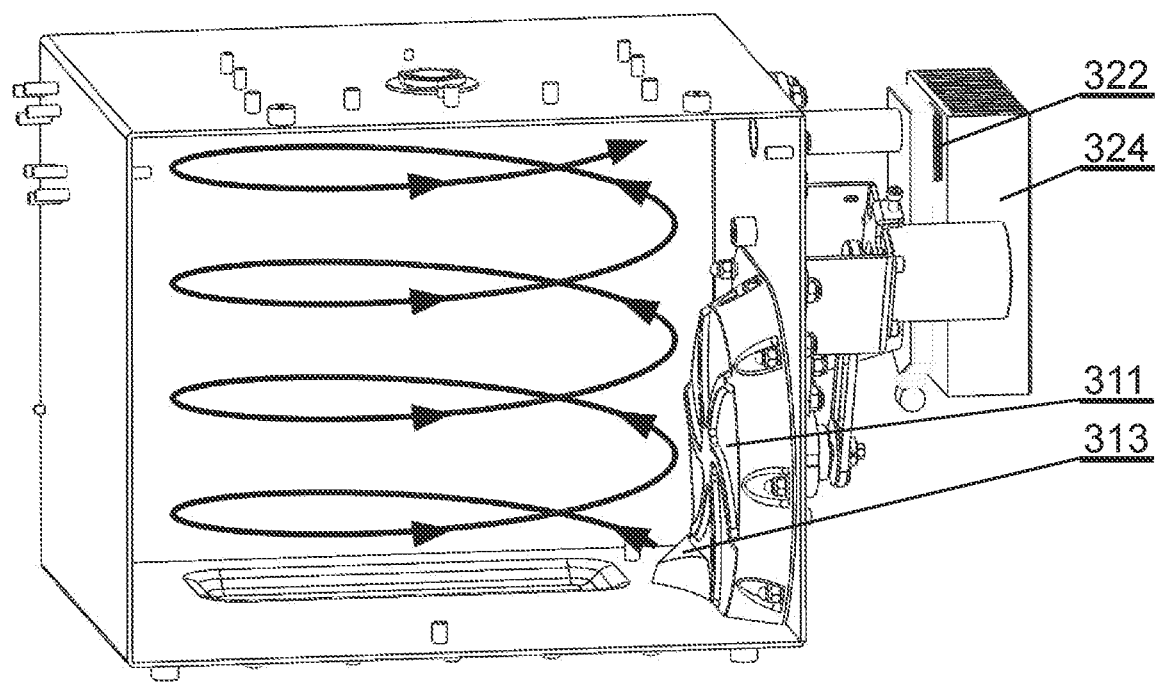
FIG. 1b presents the device with a cut-out view of a circulation system.

The chamber 110 comprises a circulation system 300, for circulating solvent vapors. Preferably, the circulation system 300 comprises a fan 311 having a nozzle 313 that influences the air within the chamber for circulating the solvent vapors inside the chamber 110 in a direction from the bottom to the top of the chamber 110 (as indicated in FIG. 1b). The shape of the nozzle shall be preferably selected such as to cause a spiral-shaped flow of vapors inside the chamber. Such flow results in even concentration of vapors inside the chamber. The flow of solvent vapors allows the details and thin walls of the product to warm up faster, which reduces the amount of solvent that concentrates on these details and heat walls, thereby reducing their smoothing as compared to larger portions of the product. The flow of solvent vapors inside the chamber from the bottom towards the top opposes the gravity force and helps, at least to a small extent, to retain the original shape of the product during the solvent vapor smoothing process, when small elements (details) of the product tend to bend downwards under gravity due to the melting action of the solvent and the high temperature.

Figure 6:
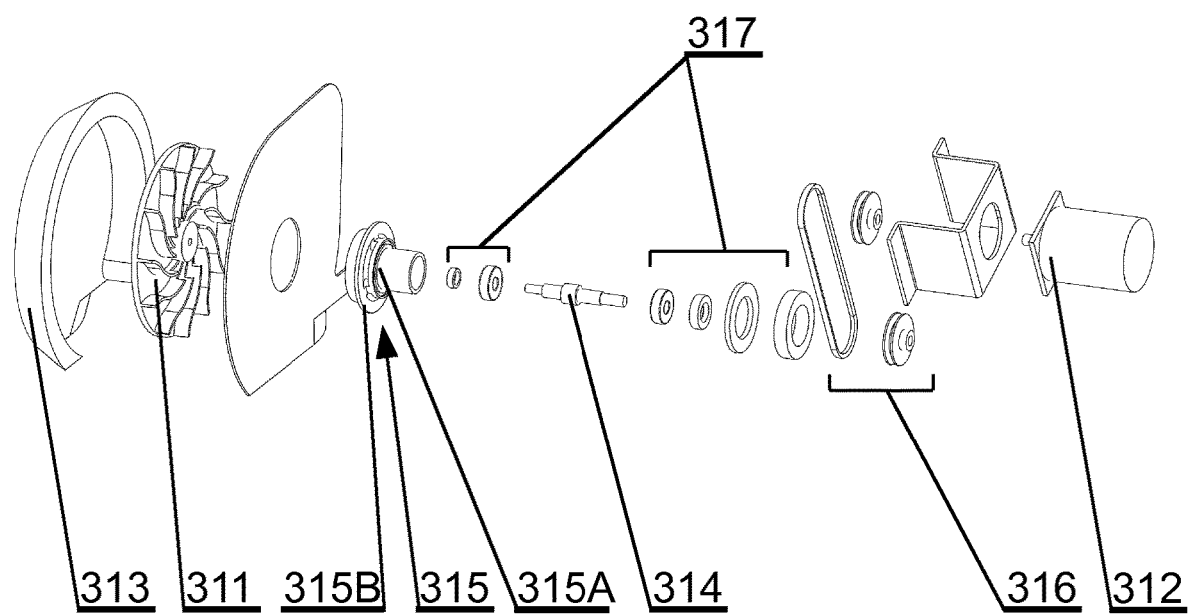
FIG. 6 presents details of a sleeve and a driving shaft in an exploded view.

The fan 311 is driven by a motor 312, which may be coupled by a belt transmission 316 with a driving shaft 314 protruding inside the chamber 110 through a sealed block 315. The sealed block 315 has a multistage sealing 317 and two crowns, wherein the first crown 315A allows to fit the sealed block to the chamber 110 providing air tightness and the second crown 315B allows the solvent to circulate towards the inside of the chamber 110. Details of the sealed block 315 and the driving shaft are presented in FIG. 6.

The device is controlled by means of a controller operable via a control panel 130, which allows the user of the device to adjust parameters of the smoothing process. Depending on the parameters introduced by the user, such as a type of the geometry of the model (e.g. simple, complex), a material of the model, a solvent type and a desired intensity of the smoothing effect, the controller calculates the process parameters such as a temperature inside the chamber, an amount of the solvent to use, pressure etc.

FIG. 2 presents the device in an isometric view, without a cover. The device comprises heating elements 220 distributed on an outer surface of at least one of the walls 112-116 for heating the interior of the chamber 110. For example, the heating elements 220 may be provided on the outer surface of the bottom wall 112 and on the outer surface of a top wall 114. The device may further comprise heating elements 220 distributed on an outer surface of the side walls 113, 115, 116. A single element may be attached to a wall or a plurality of elements, e.g. 6 elements, may be arranged over the outer surface of the wall. Moreover, at least one heating element 220 can be located directly under the evaporator 111, to effect the heating and evaporating of the solvent from the evaporator 111. The heating elements 220 located on the top wall 114 can be controlled by a first temperature sensor (e.g. a thermistor), the heating elements 220 located on the bottom wall 112 can be controlled by a second temperature sensor and the heating elements 220 located under the evaporator 111 can be controlled by a third temperature sensor. This allows for independent operation of each group of the heating elements 220 in order to control the rate (intensity) of evaporation of the solvent and the temperature in the chamber 110. If the walls 112-116 of the chamber are made of a good heat conductor (for example, aluminium), then heat can be efficiently and uniformly distributed from the heating elements 220 along the whole wall surface.

Figure 3:
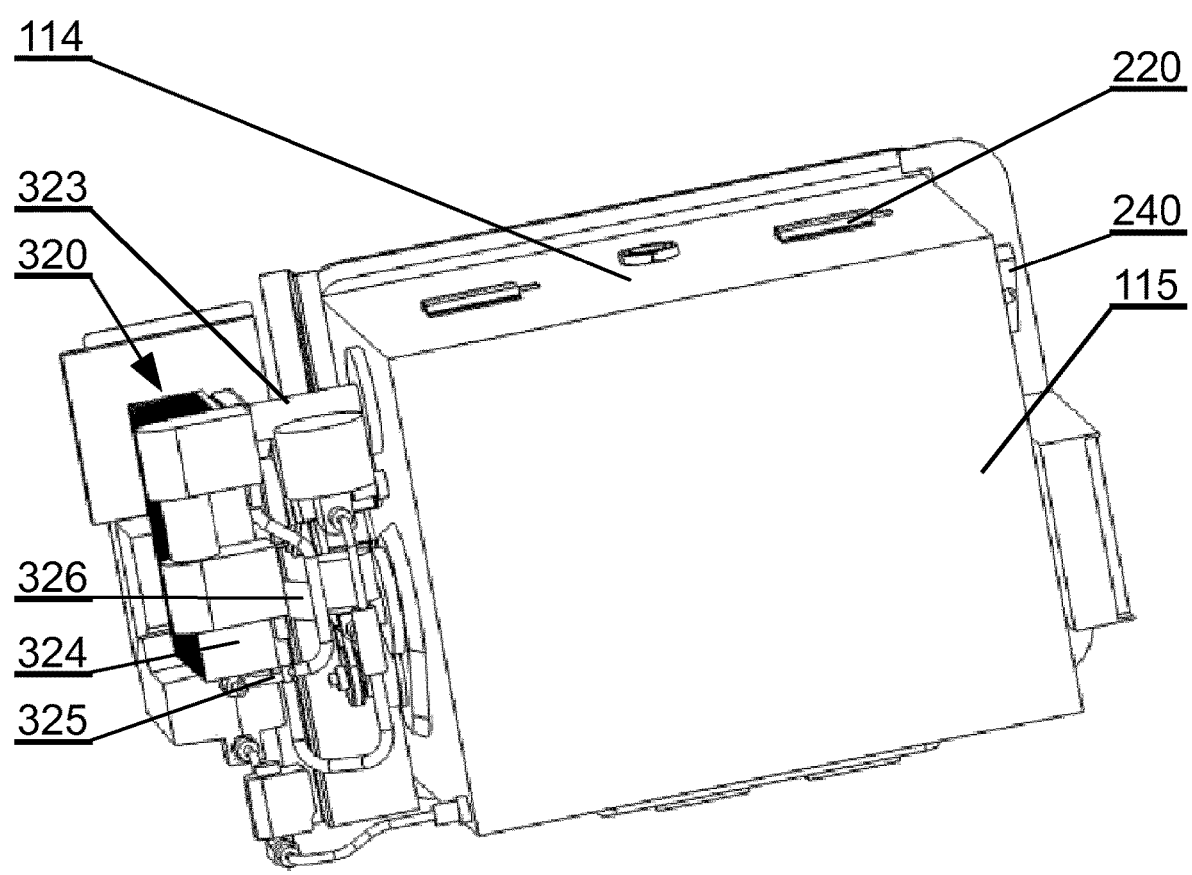
FIG. 3 presents the device without the cover in a back view.

FIG. 3 presents the device without the cover in a back view. The solvent stored in the main solvent tank 211 is gravitationally transferred to the evaporator 111 when a solvent dosing valve 213 is opened. A sensor for measuring a level of the solvent within the evaporator 111 may be located on an outer surface of the main solvent tank 211 to measure the amount of solvent within the evaporator 111. The sensor may be configured to start the measurement if the level of the solvent is above the minimum value required for a smoothing process to start. Alternatively, a sensor may be configured to provide only the information on whether the level of the solvent is above a predetermined level, wherein the amount of solvent may be calculated based on the duration of opening of the valve that doses the solvent. The amount of the transferred solvent depends on the process parameters, for example the size of the product, the type of the material it is made of, the desired degree of initial and final smoothness etc. Various solvents can be used, for example acetone, isopropyl alcohol, methyl ethyl ketone (MEK, 2-butanone). The main solvent tank 211 may be filled up with the solvent through an opening 214 located at the front of the device.

Figure 5:
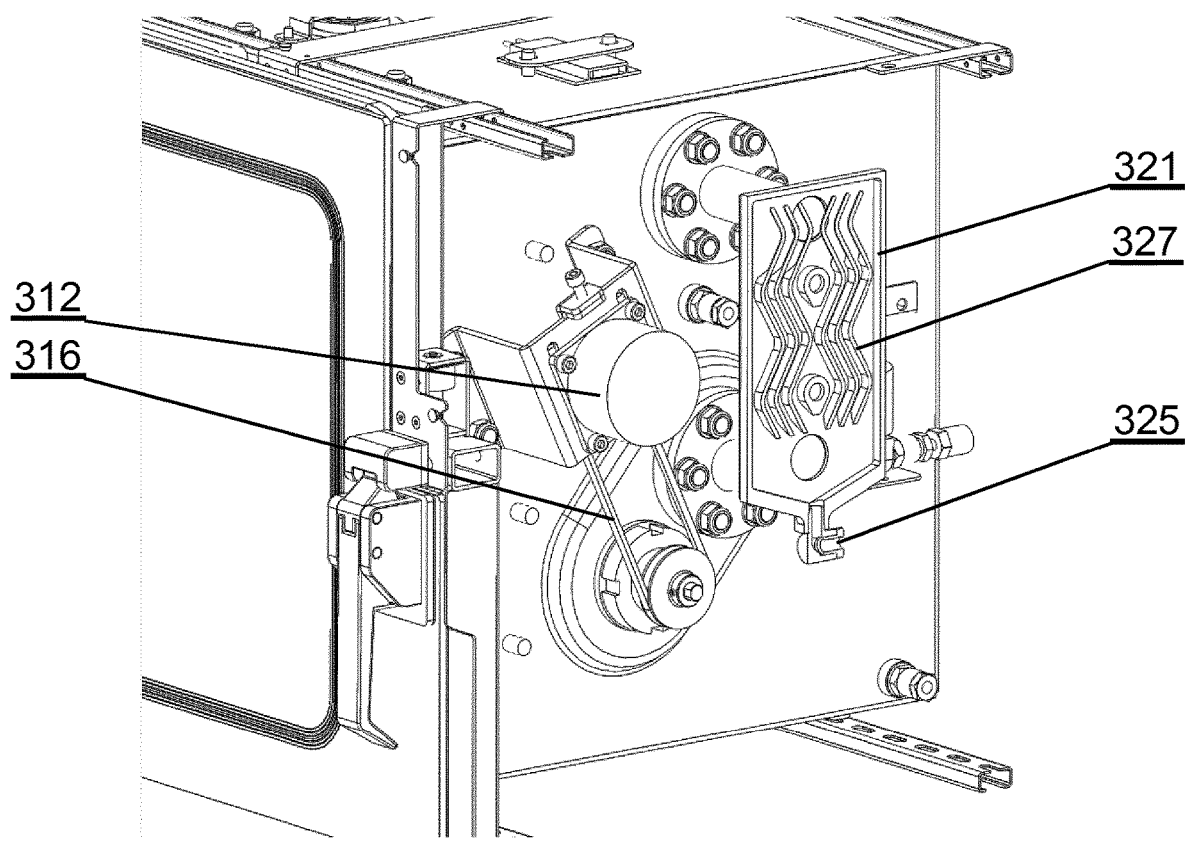
FIG. 5 presents the device without the cover and without a heat sink in an isometric view.

The circulation system 300 further comprises a refrigerating module 320 which decreases the temperature of the solvent vapor in order to condense the solvent (in particular, after the smoothing process is finished). The condensed solvent is transferred gravitationally from the refrigerating module 320 to the main solvent tank 211 through a transfer tube 325. The refrigerating module 320 comprises an inlet 323 for collecting the air saturated with solvent vapors from the upper portion of the chamber 110 and transferring it to a cooling section 321 (FIG. 5), and an outlet 326 for exhaling the dried air from the cooling section 321 back to the chamber 110. Inside the cooling section 321 there are located air ducts with multiple ribs 327 for condensing the solvent from the air. The plurality of ribs 327 increases the cooling surface of the cooling section 321. The refrigerating module 320 may comprise Peltier modules 322 which decrease the temperature of inner surfaces of the cooling section 321, to achieve a dew point for a particular concentration of the solvent in the air within the chamber (i.e. a temperature at which the air is saturated by the solvent vapor). A heat sink 324 is connected to the warm side of the Peltier modules in order to dissipate the heat away from the refrigerating module 320. Preferably, the heat sink 324 is additionally cooled down by means of two or more cooling fans attached to an inner side of the cover of the device (the fans are not shown in the drawings). The temperature of the warm side of the refrigerating module 320 is controlled by a temperature sensor coupled with the heat sink 324, while the temperature of the cold side of the refrigerating module 320 is controlled by a temperature sensor coupled with the cooling section 321. The cold side of the refrigerating module 320 can be covered with a layer of a closed cell foam which prevents condensing of water vapor, present in the air, on an outer surface of the refrigerating module 320. The foam provides heat insulation and eliminates condensed water vapor from influencing the thermal capacity of the cooling section 321.

Figure 4:
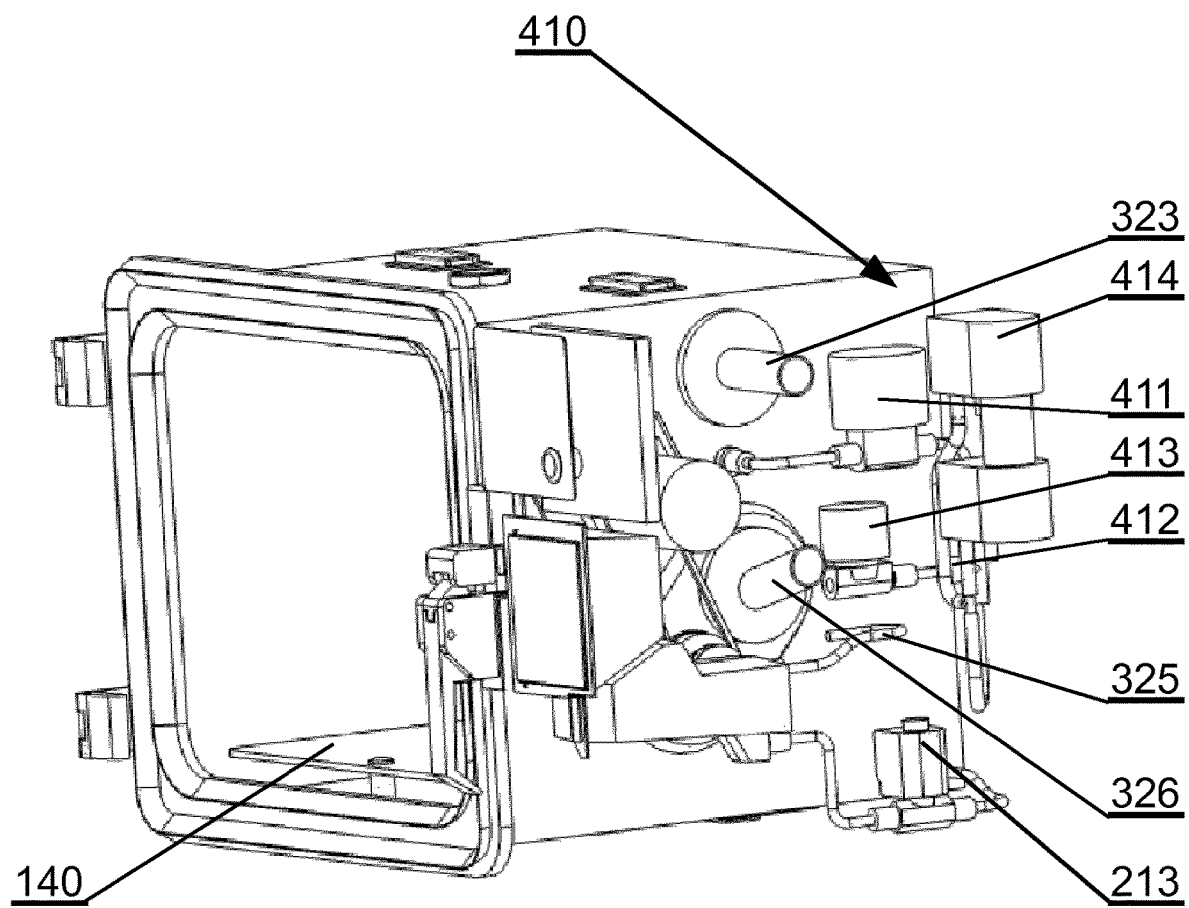
FIG. 4 presents the device without the cover and without a refrigerating system in an isometric view.

Therefore, in general, the circulation system 300 circulates solvent vapors inside the chamber 110 in a direction from the bottom to a top of the chamber 110 and outside the chamber in a direction from the top to the bottom of the chamber 110 in a closed loop system (wherein the vapors are preferably cooled and condensed to be guided to a main solvent tank 211 and then transferred as liquid solvent to the evaporator 111). FIG. 4 presents the device without the cover and without the refrigerating system in an isometric view. The device further comprises a pressure module 410 comprising a pressure valve 411 for blocking an exchange of pressure between the chamber 110 and an outer environment, a Tee fitting 412 with one end connected to the pressure valve 411, a second end connected to a vent valve 413 and a third end connected to a vacuum pump 414. The vacuum pump 414 is used to produce the negative pressure in the chamber 110 before the smoothing process is started. The value of the negative pressure in the chamber is measured by the strain gauge 240 mounted on an outer surface of the side wall of the chamber 110, for example mounted at an angle of 45° in the corner on the outer side of a side wall 116. The strain gauge 240 measures the deformation of the metal sheet of the side wall of the chamber 110. Use of the strain gauge as a pressure sensor provides faster response to pressure changes inside the chamber comparing to standard pressure sensors. It also eliminates the necessity of utilizing pressure sensors resistant to environments with an explosive atmosphere.

All elements of the device which are in contact with the solvent or solvent vapors shall be made of solvent-resistant materials, to maintain long lifetime of the device.

Figure 7:
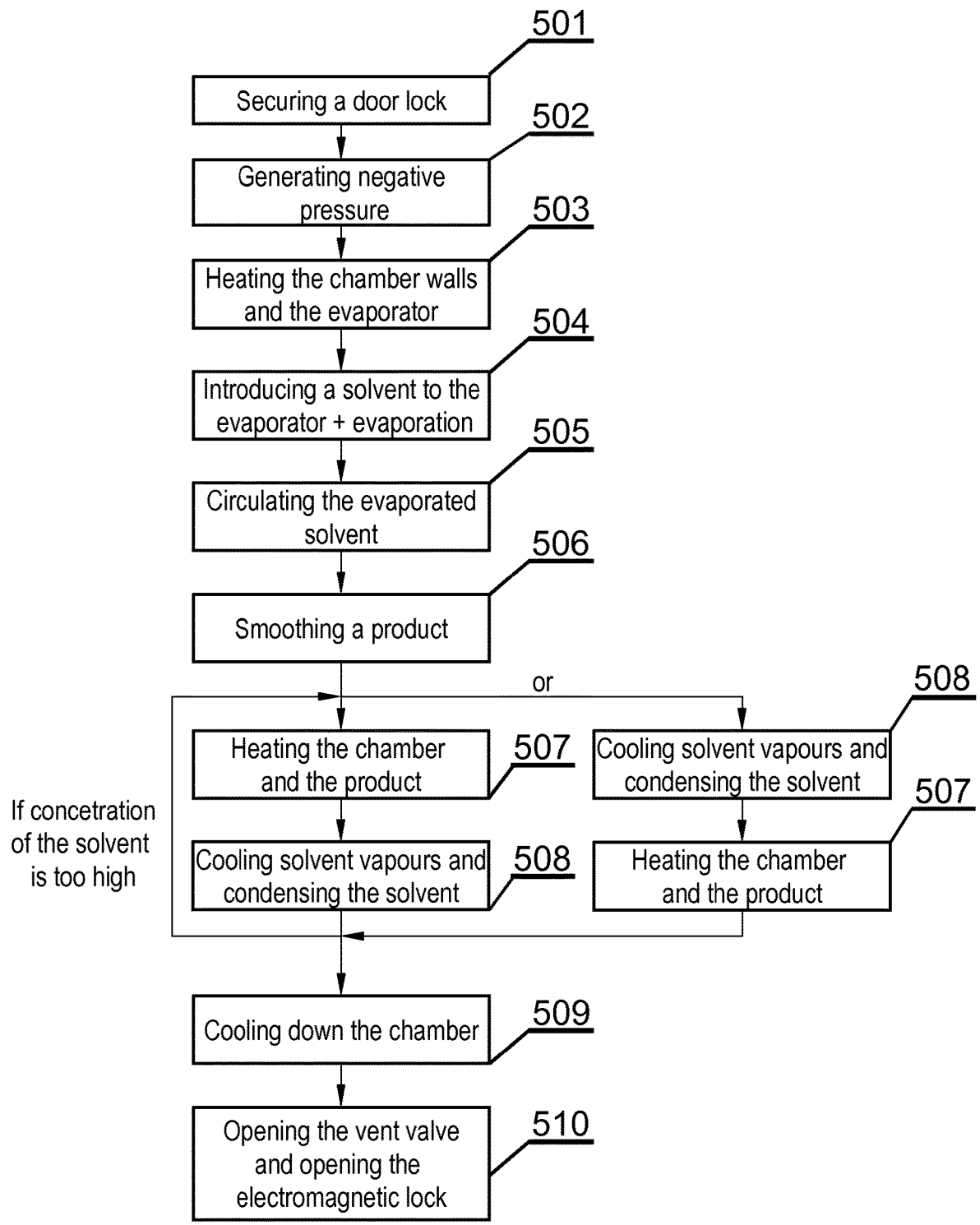
FIG. 7 presents steps of a solvent vapor smoothing process.

FIG. 7 presents a solvent vapor smoothing process. Before starting the process, a product is placed inside the chamber 110, the door 120 is closed and process parameters are determined, based on input data including: a type of geometry of the model (e.g. simple or complex), a material of the product, a type of solvent and a desired intensity of the smoothing effect etc. The process parameters that are determined accordingly include the amount of solvent to use in the process, the amount of the negative pressure to be generated, the heating temperatures of the side walls and the evaporator etc. A skilled person will realize how to calculate the process parameters based on generals rules of physics, e.g. the higher the desired smoothing effect, the higher solvent concentration shall be used. The expected dew point and the evaporation temperature of the solvent can be calculated based on the negative pressure that is to be initially generated within the chamber and the amount of solvent that is to be introduced.

First, in step 501, the door 120 is secured to prevent opening of the door during the process, which could cause toxic vapors to escape from the chamber. For example, the door can be secured with an electromagnetic lock.

Next, in step 502, the vacuum pump 414 is started to generate the negative pressure in the chamber. Preferably the negative pressure has a value from 300 to 800 mbar with respect to the ambient pressure (wherein the pressure of the ambient environment of the device is typically the atmospheric pressure), i.e. it is lower from the ambient pressure by 300 to 800 mbar. The negative pressure protects the chamber from depressurization (leaking) due to the subsequent increase of pressure during solvent vaporization which takes place further in the process. Additionally, the generated negative pressure facilitates the heating of the chamber walls, in particular the top wall and the bottom wall, without significant heating of the product and therefore facilitates generating a high temperature gradient between the product and solvent vapors before starting the vaporization. The heated walls prevent condensation of the solvent vapors on their surface, which would decrease the solvent concentration in the chamber. Furthermore condensing of the solvent vapors on the top wall of the chamber could result in solvent dropping on the models, which could jeopardize results of the smoothing process.

Next, in step 503, after achieving a desired value of the negative pressure, the heating of the chamber walls and the evaporator 111 is initiated. At least one wall, preferably at least the top wall 114, is heated to a first temperature, which is higher than the expected dew point temperature of the solvent, and preferably lower than the expected boiling temperature of the solvent. The bottom wall 112 and the side walls 113, 115, 116 are preferably heated by the heating elements 220 as well. The walls 112-116 are heated by means of thermal conduction of the wall material that transfers heat along the walls from the heating elements. At least a portion of the evaporator 111 is heated to a second temperature, which is higher than the expected boiling temperature of the solvent.

Next, in step 504, the solvent is introduced into the evaporator 111, so that it evaporates as a result of the high temperature of the evaporator 111. The amount of the introduced solvent, which is proportional to an opening duration of the dosing valve 213, depends on the desired smoothing level, for example it may be from 50 to 300 ml for a chamber working volume equal from 40 to 50 litters.

Next, in step 505, the evaporated solvent is distributed by the circulation system (from the bottom to the top of the chamber) and by means of convection. The power of the circulation system may be controlled in order to adjust the rotational velocity of the fan which directly influences the speed of flow of the solvent vapors.

Next, in step 506, the outer surface of the product is smoothed due to the solvent condensing on the surface of the product. The condensation occurs due to the fact that the temperature of the product outer surface is lower than the temperature of solvent vapors. Heating of the walls causes heating of the air inside the chamber and consequently gradual heating of the surface of the product. When the outer surface of the product achieves the temperature equal to the solvent vapors temperature, the smoothing process is stopped, because the solvent stops condensing on the product surface. Depending on the desired smoothing level, the smoothing step may last from 5 to 20 min. Most of the smoothed products have a complicated geometry, with regions of greater volumes and thin-wall elements of a smaller volume which tend to warm up faster, and therefore the time during which they react with the solvent is shorter. Shorter reaction time has a positive effect, because the prolonged solvent condensation of the surface of small elements could cause the solvent to penetrate inside the structure of the product and could decrease its strength properties, which eventually would cause its deformation. The circulation system may operate periodically or continuously (optionally with variable operating power) during the smoothing step. During the smoothing the heating elements 220 can be still active to maintain the initial temperatures.

After the smoothing is finished, in step 507, the heating elements 220 are activated in order to heat up at least one of the walls to a third temperature which is higher than the first temperature, preferably higher than the expected boiling temperature of the solvent, thereby to heat the air and the product inside the chamber. This allows to quickly evaporate the reacted solvent from the surface of the product and from the surface of the chamber walls. The evaporation of the solvent is enhanced by the negative pressure within the chamber.

Next, in step 508, the solvent vapors flow through the refrigerating unit. The inner surfaces of the cooling module are cooled below the dew point temperature for the particular concentration and pressure of the solvent. The solvent condenses on the walls of the cooling section and gravitationally flows down to the main solvent tank 211. In step 508 the heating elements can be operated with less than 100% of their maximum power, for example with 50% of their power. Alternatively, after the smoothing step 506, the step of heating the chamber 507 and the step of cooling the solvent vapors 508 may be performed in an opposite order. The steps 507 and 508 or 508 and 507 may be sequentially repeated until the desired solvent concentration is achieved. For example, the desired solvent concentration for acetone or 2-butanone may be below 40% of the lower flammability limit.

Next, in step 509, the temperature inside the chamber is equalized with the room temperature. Next, in step 510, after the chamber is cooled down, the vent valve is opened to equalize the pressure and the electromagnetic lock is opened. Subsequently the door may be opened and the smoothed product may be taken out from the chamber.

Due to the fact that solvent vapors act only on the surface of the product, then directly after the end of the process the smoothed product retains its primary plastic properties. Additionally the solvent vapor smoothing process merges the layers of the product, therefore its outer structure is integrated, and the strength parameters of the product are increased.

If some of the regions of the smoothed product have to be protected against solvent vapors, it is possible to cover them with a tape which is resistant to the solvent. For example, a kapton tape, which is easily adaptable to different shapes of products, may be used to mask the regions which are to remain intact during the smoothing process.

Owing to the presence of the initial negative pressure and solvent vapors condensation step (or steps), the presented device and the method are safe for a user and the environment, because the hazard of an explosion or a risk for the solvent escaping from the chamber is significantly limited.

While the invention presented herein has been depicted, described, and has been defined with reference to particular preferred embodiment(s), such references and examples of implementation in the foregoing specification do not imply any limitation on the invention. It will be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiment(s) described in the specification, but is only limited by the claims that follow.

The invention claimed is:

1. A method for solvent vapor smoothing of a surface of a plastic product, the method comprising the steps of:
   placing the plastic product to be smoothed in a closed chamber comprising a heated evaporator for solvent located at a bottom of the chamber;
   introducing a solvent to the heated evaporator and heating the heated evaporator to heat the solvent;
   circulating solvent vapors inside the chamber by a fan to influence circulation of the solvent vapors in a direction from the bottom to a top of the chamber;
   allowing the solvent vapors to condense on the outer surface of the product; and
   collecting solvent vapors from the upper portion of the chamber.

2. The method according to claim 1, wherein the chamber has heated walls and the method further comprises, prior to introducing a solvent to the heated evaporator, heating at least one wall of the chamber to a first temperature and heating the heated evaporator to a second temperature, wherein the first temperature is higher than the expected dew point temperature of the solvent and wherein the second temperature is higher than the expected boiling temperature of the solvent for a current pressure within the chamber.

3. The method according to claim 1, wherein the chamber has heated walls and the method further comprises, after allowing the solvent vapors to condense on the outer surface of the product, heating at least one wall of the chamber, collecting solvent vapors from the chamber and condensing the collected solvent vapors outside the chamber.

4. The method according to claim 1, further comprising, before introducing the solvent to the heated evaporator, generating within the chamber a negative pressure with respect to an ambient pressure.

5. The method according to claim 4, wherein the negative pressure equals 300 to 800 mbar.

6. A device for solvent vapor smoothing of a surface of a plastic product, the device comprising:
   a closed chamber comprising a heated evaporator for solvent located at a bottom of the chamber; and
   a circulation system for circulating solvent vapors inside the chamber in a direction from the bottom to a top of the chamber and outside the chamber in a direction from the top to the bottom of the chamber in a closed loop system, the circulation system including a fan configured to influence the circulation of the solvent vapors inside the chamber in the direction from the bottom to the top of the chamber.

7. The device according to claim 6, wherein:
   the chamber comprises heated walls;
   and the device further comprises a controller that is further configured to, before introducing the solvent to the heated evaporator:
      determine process parameters, comprising an expected dew point of the solvent and an expected boiling temperature of the solvent; and
      activate heating elements to heat at least one wall of the chamber to a first temperature and heat the heated evaporator to a second temperature, wherein the first temperature is higher than the expected dew point temperature of the solvent and wherein the second temperature is higher than the expected boiling temperature of the solvent for a current pressure within the chamber.

8. The device according to claim 6, wherein:
   the chamber further comprises a refrigerating module for collecting solvent vapors from the chamber;
   and the controller is further configured to, after allowing the solvent vapors to be condensed on the outer surface of the product:
      activate the heating elements to heat at least one wall of the chamber; and
      activate the refrigerating module to condense the collected solvent vapors outside the chamber.

9. The device according to claim 6, further comprising a pressure module with a vacuum pump for producing a negative pressure within the chamber.

10. The device according to claim 8, wherein the refrigerating module comprises air ducts for guiding the collected solvent vapors, wherein the air ducts are thermally coupled with Peltier modules.

11. The device according to claim 10, wherein a warm side of the Peltier modules is coupled with a heat sink cooled by a cooling fan.

12. The device according to claim 6, further comprising a strain gauge mounted on an outer surface of a side wall of the chamber.

13. The device according to claim 6, further comprising an electromagnetic lock for securing a door of the chamber during the smoothing process.

14. The device according to claim 6, further comprising a transfer tube for guiding solvent vapors from an inlet at the upper portion of the chamber to a main solvent tank under the force of gravity.

15. The device according to claim 14, wherein the solvent is transferrable from the main solvent tank to the heated evaporator under the force of gravity via a solvent dosing valve.

* * * * *